US007320722B2

(12) United States Patent
Mittelstadt et al.

(10) Patent No.: US 7,320,722 B2
(45) Date of Patent: Jan. 22, 2008

(54) RESPIRATORY PROTECTION DEVICE THAT HAS RAPID THREADED CLEAN AIR SOURCE ATTACHMENT

(75) Inventors: William A. Mittelstadt, Woodbury, MN (US); John M. Pilgrim, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 426 days.

(21) Appl. No.: 10/977,076

(22) Filed: Oct. 29, 2004

(65) Prior Publication Data

US 2006/0090754 A1 May 4, 2006

(51) Int. Cl.
*B01D 46/00* (2006.01)
*A62B 9/04* (2006.01)

(52) U.S. Cl. ..................... 55/505; 55/502; 55/DIG. 33; 55/DIG. 35; 128/202.27; 128/206.17

(58) Field of Classification Search .................. 55/502, 55/504, 505, 507, 510, DIG. 33, DIG. 35; 128/201.25, 202.27, 204.18, 205.27, 205.29, 128/206.16, 206.17, 206.21, 206.24, 206.12, 128/206.28, 206.29, 207.12, 207.18, 204.12, 128/204.13, 204.23
See application file for complete search history.

(56) References Cited

U.S. PATENT DOCUMENTS 2,142,064 A * 12/1938 Whipple ................ 128/206.16
2,652,828 A * 9/1953 Matheson .............. 128/201.19
2,706,983 A * 4/1955 Matheson et al. ..... 128/206.24
3,840,006 A 10/1974 Buck et al.
4,111,197 A 9/1978 Warncke et al.

(Continued)

FOREIGN PATENT DOCUMENTS

GB 2353078 A 2/2001

(Continued)

OTHER PUBLICATIONS

Product Detail for GE SmartWater™ Household Water Filtration System obtained from internet on Oct. 27, 2004 at http://www.geappliances.com/smartwater/model_fs.htm?GXSV65F.

(Continued)

*Primary Examiner*—Frank Lawrence
*Assistant Examiner*—Robert A Clemente
(74) *Attorney, Agent, or Firm*—Anna A. Wetzels

(57) ABSTRACT

A personal respiratory protection device 10 that comprises a mask body 12 that has a structure 35 located on it for receiving a clean air supply source such as a filter cartridge 14. The clean air receiving structure 35 has a first threaded portion 34. The clean air supply source has a second threaded portion 58 that has a thread 60 that mates with a thread 36 of the first threaded portion 34. The first and second threaded portions 34 and 58 engage each other at a high thread pitch and include an integral détente. A stop prevents over-rotation of the clean air supply source 14 relative to the mask body 12 during the securement operation. The inventive device allows the clean air supply source 14 to be attached to the mask body 12 with minimal rotation and is sufficiently intuitive that users may only need one hand to attach and replace the clean air source component 14 without having to remove the respirator 10 from their face.

16 Claims, 6 Drawing Sheets

U.S. PATENT DOCUMENTS

| | | | | |
|---|---|---|---|---|
| 4,172,467 | A | 10/1979 | Warnow | |
| 4,179,274 | A * | 12/1979 | Moon | 55/524 |
| 4,280,491 | A | 7/1981 | Berg et al. | |
| 4,422,861 | A | 12/1983 | Dusza | |
| 4,437,460 | A | 3/1984 | Glynn | |
| 4,462,399 | A | 7/1984 | Braun | |
| 4,548,626 | A | 10/1985 | Ackley et al. | |
| 4,586,500 | A | 5/1986 | Glynn | |
| 4,730,747 | A | 3/1988 | Schiemann | |
| 4,850,346 | A | 7/1989 | Michel et al. | |
| 4,886,056 | A | 12/1989 | Simpson | |
| 4,934,361 | A | 6/1990 | Michel et al. | |
| 4,965,887 | A | 10/1990 | Paoluccio et al. | |
| 5,022,901 | A | 6/1991 | Meunier | |
| 5,033,465 | A | 7/1991 | Braun et al. | |
| 5,036,844 | A | 8/1991 | Pouchot et al. | |
| 5,062,421 | A | 11/1991 | Burns et al. | |
| 5,063,926 | A | 11/1991 | Forsgren et al. | |
| 5,125,402 | A | 6/1992 | Greenough | |
| 5,222,488 | A | 6/1993 | Forsgren | |
| 5,325,892 | A | 7/1994 | Japuntich et al. | |
| 5,344,626 | A | 9/1994 | Abler | |
| 5,411,021 | A | 5/1995 | Gdulla et al. | |
| RE35,062 | E | 10/1995 | Brostrom et al. | |
| 5,474,060 | A | 12/1995 | Evans | |
| 5,496,785 | A | 3/1996 | Abler | |
| 5,509,436 | A | 4/1996 | Japuntich et al. | |
| 5,579,761 | A | 12/1996 | Yuschak et al. | |
| 5,592,935 | A | 1/1997 | Elstran et al. | |
| 5,732,695 | A * | 3/1998 | Metzger | 128/206.12 |
| 5,763,078 | A | 6/1998 | Braun et al. | |
| 5,810,001 | A | 9/1998 | Genga et al. | |
| 5,924,420 | A | 7/1999 | Reischel et al. | |
| 5,938,081 | A | 8/1999 | Foster et al. | |
| 6,014,971 | A | 1/2000 | Danisch et al. | |
| 6,016,804 | A * | 1/2000 | Gleason et al. | 128/206.17 |
| 6,055,983 | A * | 5/2000 | Metzger | 128/206.17 |
| 6,099,293 | A | 8/2000 | Kern et al. | |
| 6,119,691 | A | 9/2000 | Angadjivand et al. | |
| 6,119,692 | A | 9/2000 | Byram et al. | |
| 6,139,308 | A | 10/2000 | Berrigan et al. | |
| 6,186,140 | B1 | 2/2001 | Hoague | |
| 6,196,423 | B1 | 3/2001 | Erxleben | |
| 6,214,094 | B1 | 4/2001 | Rousseau et al. | |
| 6,216,693 | B1 | 4/2001 | Rekow et al. | |
| 6,240,567 | B1 | 6/2001 | Johnston | |
| 6,248,280 | B1 | 6/2001 | Kern et al. | |
| 6,250,299 | B1 | 6/2001 | Danisch et al. | |
| D449,099 | S | 10/2001 | Juhlin et al. | |
| D449,103 | S * | 10/2001 | Legare | D24/110 |
| 6,363,934 | B2 * | 4/2002 | Metzger | 128/206.16 |
| 6,375,886 | B1 | 4/2002 | Angadjivand et al. | |
| 6,391,429 | B1 | 5/2002 | Senkus et al. | |
| 6,397,458 | B1 | 6/2002 | Jones et al. | |
| 6,406,657 | B1 | 6/2002 | Eitzman et al. | |
| 6,409,806 | B1 | 6/2002 | Jones et al. | |
| 6,454,986 | B1 | 9/2002 | Eitzman et al. | |
| 6,457,473 | B1 | 10/2002 | Brostrom et al. | |
| 6,478,025 | B1 | 11/2002 | Yort et al. | |
| 6,497,756 | B1 * | 12/2002 | Curado et al. | 96/117.5 |
| RE37,974 | E | 2/2003 | Bowers | |
| 6,575,165 | B1 * | 6/2003 | Cook et al. | 128/206.17 |
| 6,591,837 | B1 | 7/2003 | Byram | |
| 6,615,828 | B1 | 9/2003 | Petherbridge | |
| 6,627,563 | B1 | 9/2003 | Huberty | |
| 6,660,210 | B2 | 12/2003 | Jones et al. | |
| 6,666,209 | B2 | 12/2003 | Bennett et al. | |
| 6,715,490 | B2 | 4/2004 | Byram | |
| 6,732,733 | B1 | 5/2004 | Brostrom et al. | |
| 6,743,464 | B1 | 6/2004 | Insley et al. | |
| 6,799,573 | B1 * | 10/2004 | Bonner | 128/205.27 |
| 6,854,464 | B2 * | 2/2005 | Mukaiyama et al. | 128/206.17 |
| 6,874,499 | B2 * | 4/2005 | Viner et al. | 128/201.25 |
| 2001/0054424 | A1 * | 12/2001 | Salapow et al. | 128/206.17 |
| 2002/0195108 | A1 | 12/2002 | Mittelstadt et al. | |
| 2002/0195109 | A1 | 12/2002 | MIttelstadt et al. | |
| 2003/0047183 | A1 | 3/2003 | Kiefer et al. | |
| 2003/0075180 | A1 | 4/2003 | Raje et al. | |
| 2003/0126729 | A1 | 7/2003 | Pierce | |
| 2004/0079373 | A1 * | 4/2004 | Mukaiyama et al. | 128/205.27 |

FOREIGN PATENT DOCUMENTS

| | | |
|---|---|---|
| KR | 20-0237656 | 12/2001 |
| WO | WO 03/052438 A1 | 6/2003 |

OTHER PUBLICATIONS

Product Detail for GE SmartWater™ Twist and Lock System obtained from internet on Oct. 27, 2004 at http://www.geappliances.com/smartwater/pop_twist_lock.htm.

Five photographs of the GE SmartWater™ system.

Five photographs of the GE SmartWater™ system, (2004).

* cited by examiner

RESPIRATORY PROTECTION DEVICE THAT HAS RAPID THREADED CLEAN AIR SOURCE ATTACHMENT

The present invention pertains to a personal respiratory protection device that has a clean air source attachment that can be quickly rotated into engagement with a respirator mask body.

BACKGROUND

Personal respiratory protection devices are regularly used to supply clean air to a user of the device. The clean air is commonly available to the user by first drawing ambient air through a filter that is disposed in a filter cartridge. The filter cartridge typically is attached to a mask body that is worn on a person's face, over their nose and mouth. The ambient air is drawn through the filter from negative pressure created by the wearer's lungs. In other methods, clean air may be supplied to the user under pressure from a blower that forces the ambient air through a filter that is worn around the user's waist. This pressurized device is known as a powered air purifying respirator or PAPR. Alternatively, clean air has been furnished to the user from a pressurized tank, also known as a self-contained breathing apparatus or SCBA. In each of these techniques, a clean air supply source (such as a filter cartridge or a hose from a PAPR or SCBA) is connected to a mask body that is worn over the nose and mouth of the user. The eyes may be covered as well if the user desires full face protection.

A variety of systems have been developed in the respirator art to attach the clean air source to the respiratory mask. A common system uses a threaded filter cartridge that is attached to a corresponding threaded fitting on the respirator body—see, for example, U.S. Pat. Nos. 5,222,488, 5,063,926, 5,036,844, 5,022,901, 4,548,626, and 4,422,861. The threaded filter cartridges typically possess helical or advancing spiral threads that mate with a tapped collar or socket. Rotating the filter cartridge in an appropriate direction multiple times allows the cartridge to be attached to or removed from the mask body. A resilient, deformable gasket often is used to ensure that an airtight fit is maintained at the interface with the respirator body.

In lieu of threads, bayonet type closures have been used to attach clean air sources to respirators. The bayonet type closure has locking tabs and notches to secure the components together. The locking tabs may project from a filter cartridge and may engage the notches in an aperture on the respirator body. By rotating the filter cartridge in the appropriate direction, the cartridge engages the mask body—see U.S. Pat. Nos. 6,216,693 and 5,924,420. An audible device has been used in a bayonet system to indicate that the filter cartridge is properly coupled to the respirator face piece—see U.S. Pat. Nos. 4,934,361, and 4,850,346. A lug on the face piece has been provided with a détente ramp or cam that has an inclined surface. The surface is positioned to gradually deflect or deform a rib on the cartridge. As the cartridge and face piece are rotated relative to each other into a locking position, the cam engages the rib and causes the rib and lug to deflect until the rib abruptly drops off the end of the cam. The abrupt action produces the audible click. The benefit of using a bayonet-type fitting is that the cartridge can engage the mask body with a quick turn, usually less than about one-half turn—see, for example, U.S. Pat. No. 6,216,693 to Rekow et al.

Respirators that have snap-fit filter cartridges also have been designed as shown in U.S. Pat. No. 5,579,761 to Yushack et al. In this approach, the filter cartridge is instantaneously snapped into engagement with the mask body simply by pressing the cartridge against a corresponding receiving structure on the mask body. No rotational movement of the filter cartridge is needed.

Although the above-discussed respirators use various techniques for securing a clean air source such as a filter cartridge to a respirator, these techniques do have a number of drawbacks. For instance, the filter cartridges that are threaded to the respirator typically use a low thread pitch, which requires multiple rotations to complete the engagement. Bayonet structures tend to eliminate this difficulty, but these fittings require that the two components be appropriately aligned so that each locking tab is placed in each appropriate notch before the parts are rotated into engagement. And while snap-fit cartridges can be very convenient, the filter cartridge can nonetheless rotate relative to the mask body, even after being fully engaged.

SUMMARY OF THE INVENTION

The present invention provides a personal respiratory protection device that comprises (a) a mask body that has a first threaded portion; (b) a clean air supply source that has a second threaded portion, the second threaded portion is adapted to mate with the first threaded portion on the mask body, wherein (i) the first and second threaded portions engage each other at a high thread pitch; (ii) the first and second threaded portions comprise an integral détente; and (iii) the first and second threaded portions have a stop associated therewith, which stop prevents over-rotation of the clean air source relative to the mask body during securement of the cartridge to the mask body.

The present invention provides an advantage in ease of use over known threaded and bayonet attachment systems. As indicated above, known threaded systems require multiple turns to secure the clean air source to the mask body, and bayonet systems can be somewhat cumbersome for the user to align, particularly when the mask body has already been donned. The present inventive concept, in contrast, can allow for engagement with minimal rotation and is sufficiently intuitive that users may need only one hand to remove or attach a clean air source component, without removing the mask body from their face during use. When the parts are turned relative to each other, the threads or interfacing parts may tighten or compress to form a seal at the seal attachment. If desired, a resilient sealing member or gasket may be used to provide a continuous seal along the entire coupling perimeter. At the completion of the quick rotation, the end of the respirator thread reaches a détente integral to the thread(s), causing an indicating action that alerts the user of the engagement. The stop prevents further rotation at this point and combined with the détente, thus enables the clean air source component to be positioned in place for use. Since the détente is integral to the thread, the overall system can be compact and easy to implement. Further, the détente allows for use of the high thread pitch, which results in rapid engagement. In contrast, conventional threaded systems use low pitch threads that frictionally engage each other to prevent inadvertent reverse rotation.

These and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

GLOSSARY

The terms set forth below will have the meanings as defined:

"clean air" means air that has been filtered or that has otherwise been made safe to breath;

"clean air supply source" means an apparatus or part(s) that is capable of engaging a mask body for providing clean air to a wearer when the mask body is worn;

"compliant face contacting member" means the portion of a mask body that is compliantly fashioned for allowing the mask body to be comfortably supported over a person's nose and mouth;

"détente" means a structure that provides an indicating action of engagement between the first and second threaded portions when the détente is engaged;

"exterior gas space" means the ambient atmospheric gas space that surrounds a mask body when worn on a person and that ultimately receives exhaled gas after it exits the interior gas space of a mask;

"filter cartridge" means a structure that includes a filter element and that is adapted for connection to a mask body of a personal respiratory protection device;

"harness" means an element or combination of elements or parts, which elements or combination, allows a mask body to be supported at least over a wearer's nose and mouth;

"high pitch" means that the thread pitch is sufficiently great to enable the components to complete engagement in about one rotation (360°) or less;

"integral" means that the parts in question (such as a détente or portion thereof and thread(s)) are joined together as a single continuous part and are not separated from each other by the other by other structures;

"interior gas space" means the space that exists between a mask body and a person's face when the mask is being worn;

"mask body" means a structure that can fit at least over the nose and mouth of a person and that can help define an interior gas space separate from an exterior gas space;

"personal respiratory protection device" means a device that is worn by a person over at least the respiratory passages (nose and mouth) and that is adapted for providing a safe supply of clean air to the person for breathing;

"stop" means a mechanism or structure that is designed to prevent further rotation; and "threaded portion" means a helical or spiral ridge that is used to engage another helical or spiral ridge through rotational movement relative to each other.

DETAILED DESCRIPTION OF THE PREFERRED EMBODIMENTS

In describing preferred embodiments of the invention, specific terminology is used for the sake of clarity. The invention, however, is not intended to be limited to the specific terms so selected, and it is to be understood that each term so selected includes all technical equivalents that operate similarly.

In the practice of the present invention, a personal respiratory protection device is provided, which device comprises a mask body and a clean air supply source. The clean air supply source can be a filter cartridge or a hose or other conduit, which hose or conduit are in fluid communication with a PAPR filter cartridge or SCBA tank. The mask body has a first threaded portion located on it for receiving the clean air supply source. The clean air supply source has a second threaded portion that has thread(s) that are adapted to mate with thread(s) of the first threaded portion on the mask body. The first and second threaded portions engage each other at a high thread pitch and comprise a détente that indicates when the engagement is complete. The détente also may act to preclude inadvertent reverse rotation once the détente is engaged. A stop is provided to prevent over-rotation of the clean air source relative to the mask body during securement.

Figure 1:
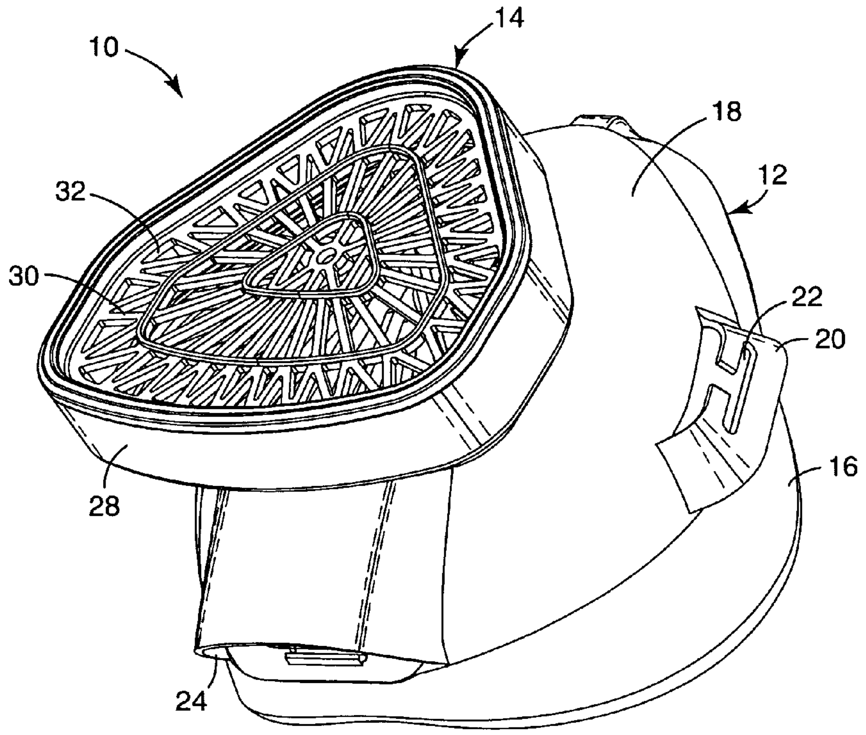
FIG. 1 is a perspective view of a personal respiratory protection device 10 in accordance with the present invention.
Figure 2:
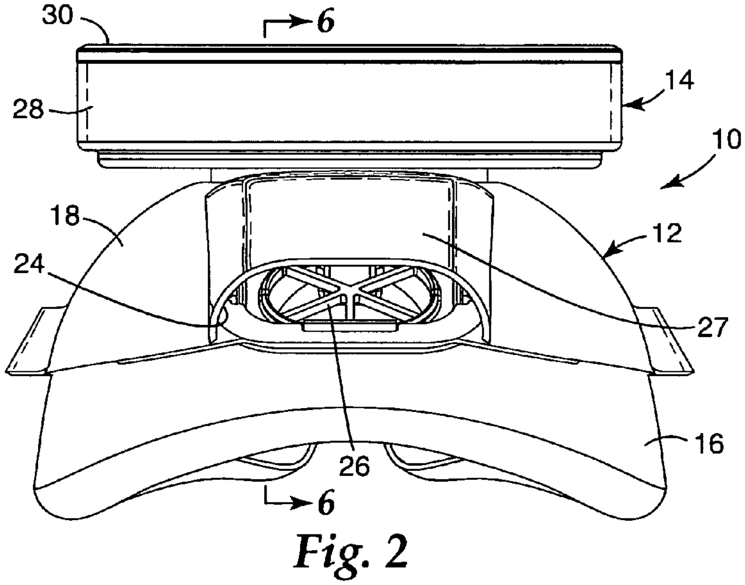
FIG. 2 is a bottom view of a personal respiratory protection device 10 in accordance with the present invention.
Figure 3:
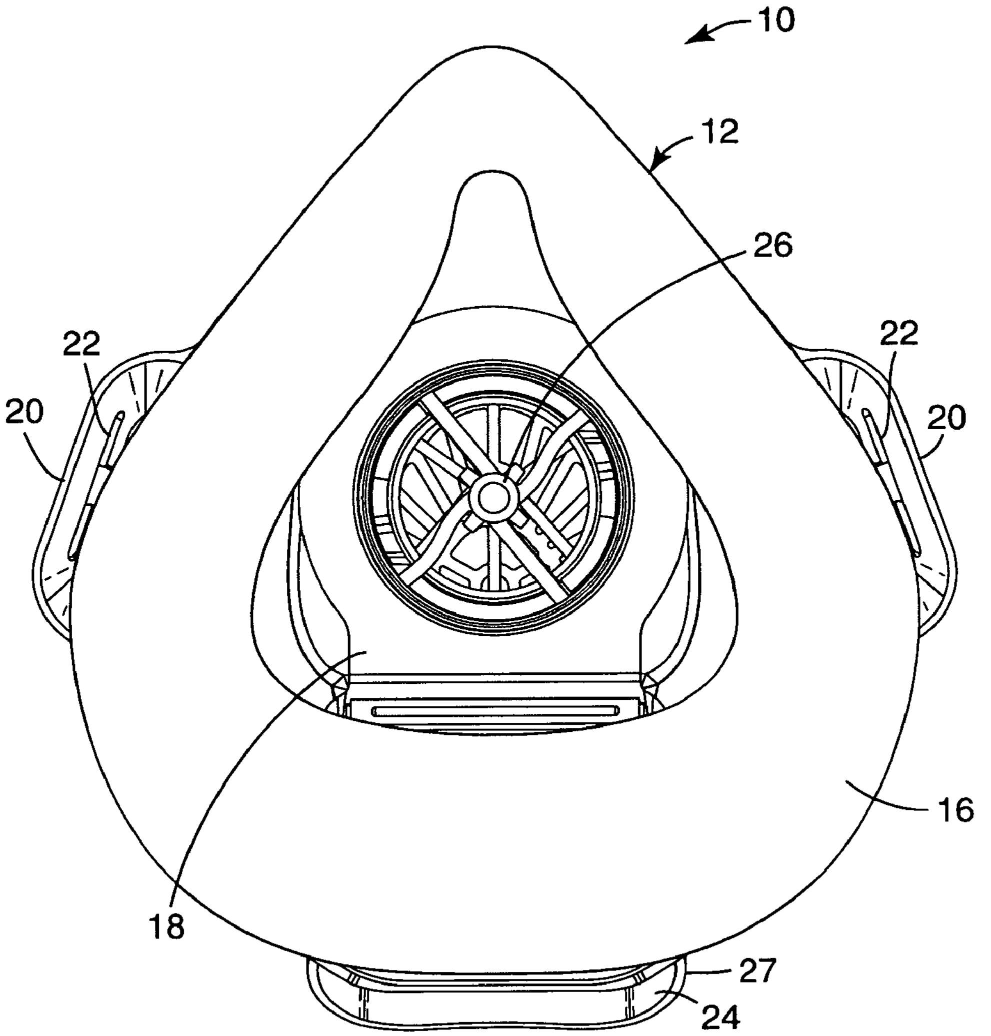
FIG. 3 is a rear view of a personal respiratory protection device 10 in accordance with the present invention.

FIGS. 1-3 illustrate a negative pressure personal respiratory protection device 10 that has a mask body 12 and a clean air supply source or filter cartridge 14. The respiratory protection device 10 is referred to as a "negative pressure" mask since it relies on the wearer's lungs to draw air into the mask rather than a "positive pressure" source such as a powered fan or compressed air. As indicated above, positive pressure masks use air from a blower or pressure tank, which devices are commonly carried by the wearer, to deliver the supply of clean air or oxygen. The positive pressure systems regularly use a hose or appropriate conduit as the attachment component for the clean air supply source. Examples of PAPRs are shown in U.S. Pat. Nos. 6,250,299, 6,186,140, 6,014,971, 5,125,402, 4,965,887, 4,462,399, and 4,280,491. PAPRs force air through a filter that is commonly placed in a unit that is worn about the waist of the wearer. Examples of blowers that may be used in connection with a supplied air system for directing air into the interior gas space are shown in U.S. Pat. Nos. 6,575,165B1 and D449,099S. A flow sensor may be used on the supplied air helmet to provide an indication of when air flow into the breathing zone falls below a safe level—see U.S. Pat. No. 6,615,828 B1 to Petherbridge. In addition, a non-volatile memory device may be attached to the filter element to keep a record of the filter element's usage—see U.S. Pat. No. 6,186,140 B1 to Hogue. Airflow into the interior gas space can be calibrated to indicate flow rate—see U.S. Pat. No. 6,666, 209B2 to Bennett et al. Examples of SCBA systems are shown in U.S. Pat. Nos. 6,478,025, 4,886,056, 4,586,500, and 4,437,460.

In FIGS. 1-3, the mask body 12 is a "half mask" that fits over the nose and mouth of the wearer. The invention, however, does contemplate use of a “full face” mask body, which covers the eyes as well—see, for example, U.S. Pat. No. 5,924,420 to Reischel et al. The mask body 12 includes a compliant face contacting member 16 and a rigid structural member 18. The rigid structural member 18 may include one or more parts joined together or operating separately for supporting fluid communication components and supporting structures such as harnesses. Rigid structural member 18 has a harness receiving structure 20 located thereon for receiving a harness that enables the mask body 12 to be supported on a person's head when in use. The harness receiving structure 20 includes a slot 22 for receiving a harness strap. The harness strap can be slidably passed through the slot 22 to allow for adjustment to properly fit the wearer's head. Examples of harnesses that could be used in conjunction with personal respiratory protection devices of the present invention include those described in U.S. Pat. Nos. 6,715,490, 6,591,837, and 6,119,692 to Byram et al., and in U.S. Pat. Nos. 6,732,733 and 6,457,473 to Brostrom et al. The rigid structured member 18 also includes an exhalation port 24 that allows exhaled air to be exhausted from the interior gas space. The interior gas space is defined, for the most part, by the mask body 12 and the wearer's face. The mask body 12 is spaced from the wearer's face and creates an air space from which the wearer inhales clean air. An exhalation valve 26 can be provided on the mask body 12 (as part of the rigid structural member 18) to preclude air from entering the interior gas space during an inhalation while also allowing exhaled air to be rapidly exhausted from that space during an exhalation. Exhaled air passes through the exhalation valve 26 (flap not shown) to enter the exterior gas space. A valve cover 27 may be provided over the dynamic element of the valve to protect it. The valve cover 27 and its port 24 may be configured to direct air downwardly away from the wearer's vision. Examples of exhalation valves that could be used in connection with masks of the present invention include those described in the following patent documents: 2002-0195108-A1 and 2002-0195109-A1 to Mittelstadt et al. and U.S. Pat. Nos. 5,509,436 and 5,325,892 to Japuntich et al., and RE37,974 to Bowers. These exhalation valves all include a flexible flap that dynamically opens in response to exhaled air.

In FIGS. 1-3, the illustrated filter cartridge 14 has a housing 28 into which a filter element is contained. A housing cover or grid 30 may be provided on the front face of the filter cartridge 14 to protect the filter element. The cartridge cover 30 may have multiple openings 32 located therein to allow air from the exterior gas space to be easily drawn through the cover 30 so that it can be filtered by the filter element during an inhalation. The filter element could be a gaseous and/or particulate filter, examples of which are shown or discussed in the following patent documents: U.S. Pat. No. 6,743,464 to Insley et al., U.S. Pat. No. 6,627,563B1 to Huberty, U.S. Pat. No. 6,454,986 to Eitzman et al., U.S. Pat. Nos. 6,660,210, 6,409,806, and 6,397,458 to Jones et al., U.S. Pat. No. 6,406,657 to Eitzman et al, U.S. Pat. No. 6,391,429 to Senkus et al., U.S. Pat. No. 6,375,886 to Angadjivand et al., U.S. Pat. No. 6,214,094 to Rousseau et al., U.S. Pat. No. 6,139,308 to Berrigan et al., and U.S. Pat. No. 6,119,691 to Angadjivand et al., U.S. Pat. Nos. 5,763,078 and 5,033,465 to Bran et al., and U.S. Pat. Nos. 5,496,785 and 5,344,626 to Abler. Gaseous filters may include activated carbon granules in, for example, packed bed or bonded form. Compressive forces from the filter cartridge housing can hold the granules together in packed bed form; whereas, bonded granules are held together by adhesive or polymeric particles. Particulate filters often include electrically-charged microfibers that are in the form of a non-woven fibrous web.

Figure 4:
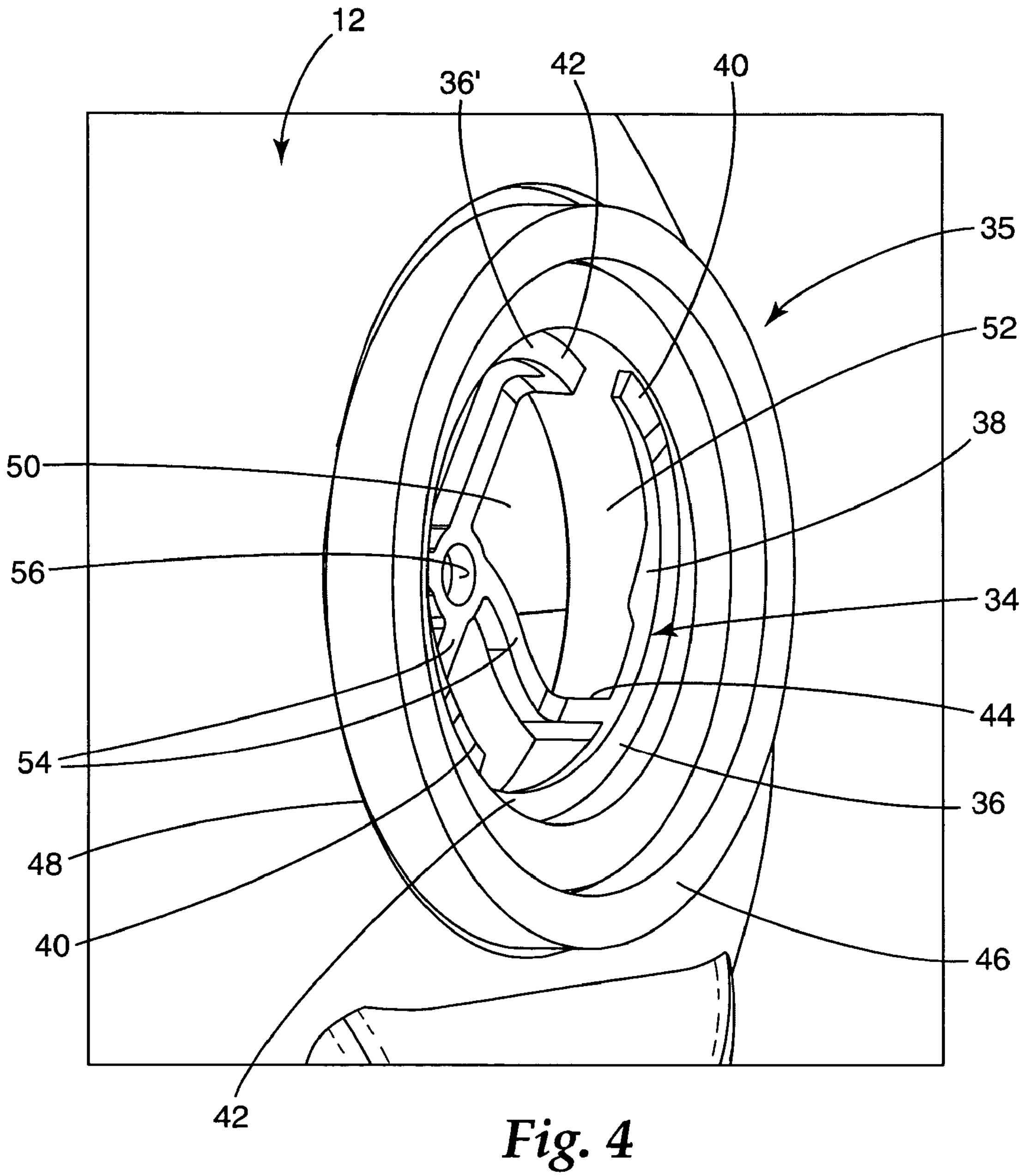
FIG. 4 is an enlarged perspective view of a clean air source receiving structure 35 that is disposed on the mask body 12 of a personal respiratory protection device in accordance with the present invention.

FIG. 4 shows a detailed view of a first threaded portion 34 that is disposed on a respiratory mask body 12. The first threaded portion 34 is disposed on a clean air source receiving structure 35 and includes high-pitch threads 36, 36'. The high-pitch threads 36, 36' may each include a first portion of a male détente 38. The high-pitched thread 36, 36' begins at location 40 and ends at location 42. A stop 44 is positioned adjacent to the thread 36 for stopping rotation of the cartridge and mask body when the two parts are turned relative to each other. As shown, the stop 44 is located about 90° from the start 40 of thread 36. An additional stop may be associated with thread 36' but is not necessary. Although a détente may be provided on each thread, only one is necessary. The male détente 38 is integrally provided in the first threaded portion 34. The first threaded portion 34 acts as the female threaded member in that it receives the mask body 12 (FIGS. 1-3) during engagement. A sealing member 46 may be provided to provide an air-tight seal at the base of the clean air supply source and at the base 48 of the mask body 12. The sealing component 46 may be a resilient gasket that provides a continuous seal about the perimeter of the engaged parts. The sealing member may be manufactured as an integral part of the compliant face contacting member 16 (FIGS. 1-3). The sealing member thus may be manufactured at the same time as when the compliant face contacting member is manufactured and not be a part that is separately made. The mask body has an opening 50 through which filtered air may pass to enter the interior gas space. The opening 50 includes a cylindrical wall 52 onto which the first threaded portion 34 is disposed. A plurality of radially extending members 54 may extend from the wall 52 toward a central location 56 through which a pin may pass to support a diaphragm or flap that dynamically reacts to the flow of air that passes through opening 50. Air that passes through the opening 50 is directed into the interior gas space. The members 54, thus, support the inhalation valve in opening 52 axially inward from the threaded portion 34.

Figure 5:
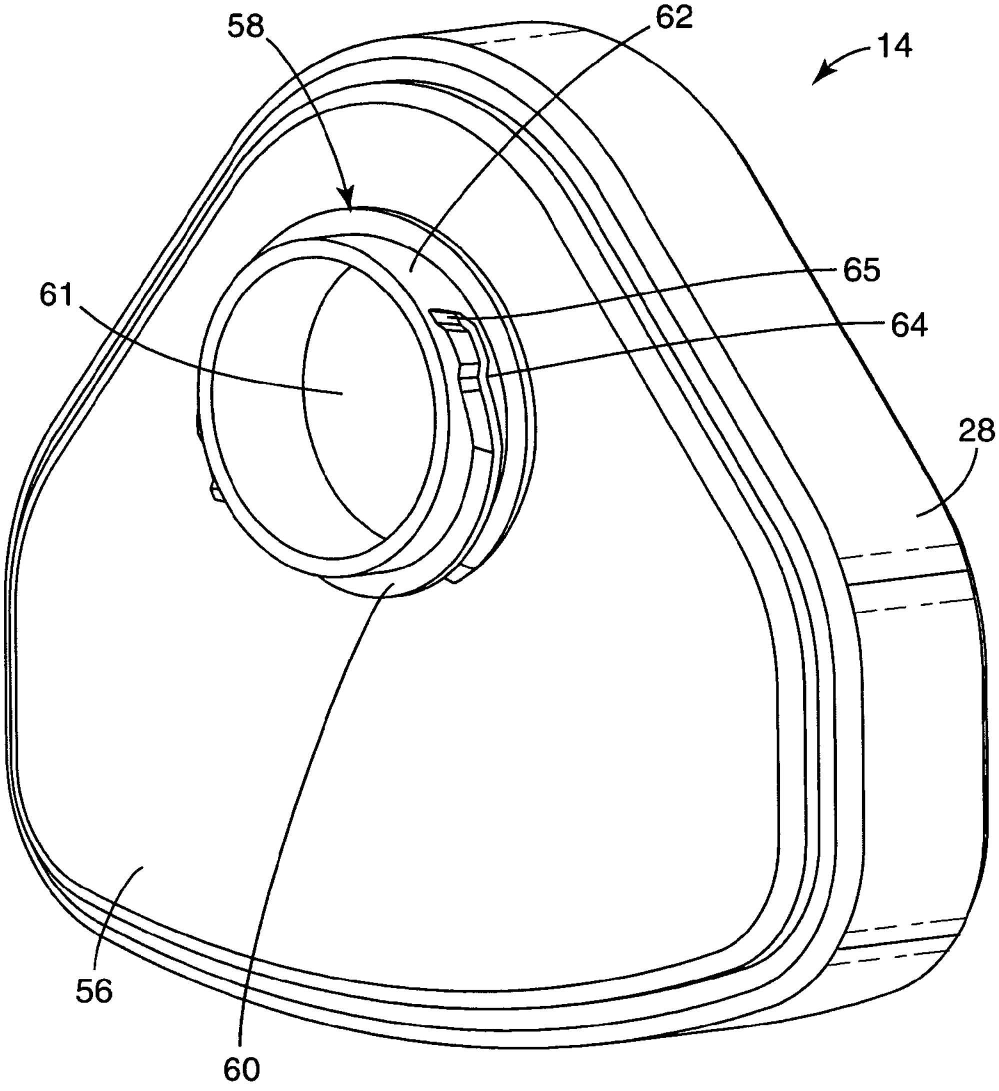
FIG. 5 is a rear perspective view of a filter cartridge 14 in accordance with the present invention.

FIG. 5 shows a rear view of the filter cartridge 14. The filter cartridge 14 includes a housing 28 that receives a filter element for filtering ambient air before it is inhaled. The housing includes a rear wall 56 that faces the mask body 12 (FIGS. 1-4) when the two parts are engaged. A second threaded portion 58 is provided on the filter cartridge 14 for engaging the first threaded portion 34 (FIG. 4) located on mask body 12 (FIG. 4). The second threaded portion 58 includes a second high-pitch thread 60. The thread of the first and second threaded portions may advance about 5 to 15 millimeters (mm), preferably about 6 to 8 mm, for each revolution. The high-pitch thread 60 is located on the outer wall of an axially-extending cylindrical member 62. The second thread 60 includes an integrally-disposed female second détente 64 that engages the male portion of the détente 38 located on mask body 12 (FIG. 4).

Figure 6:
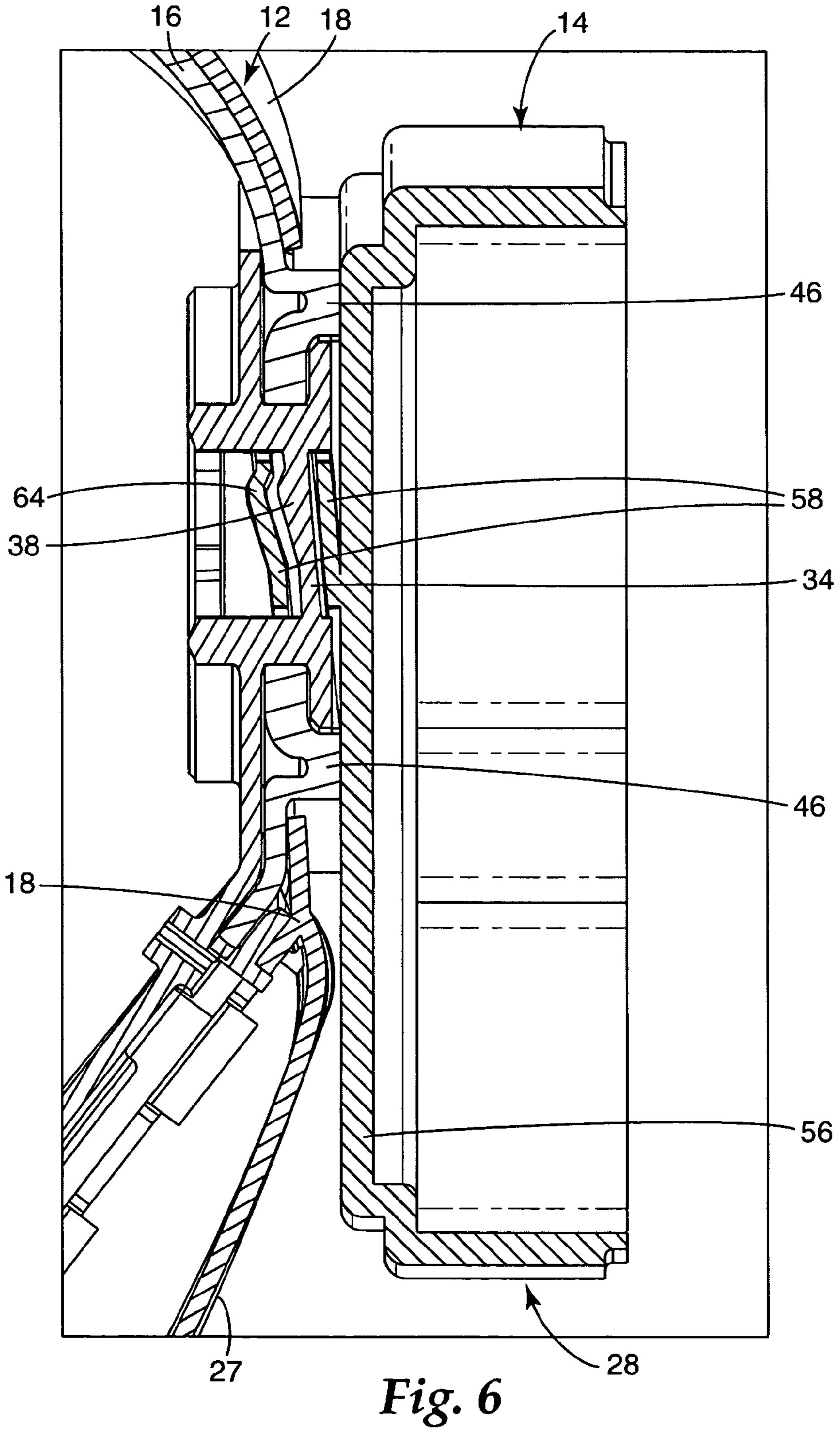
FIG. 6 is a cross-sectional view taken along line 6-6 of FIG. 2, showing the filter cartridge 14 engaged with the mask body 12 using the threaded system in accordance with the present invention.

FIG. 6 shows filter cartridge 14 in an engaged position with mask body 12. When the détente is engaged, the male portion 38 of the détente is in alignment with the female portion 64 of the détente. The first threaded portion 34, of course, is in engagement with the second threaded portion 58. The annular sealing member 46 is resiliently compressed during the engagement to provide a hermetic seal between the rear wall 56 of housing 28. Because of its resilient nature—that is, its ability to substantially recover its original shape when compression force(s) are removed—the resilient member can be reused when the filter cartridge is replaced.

Alternatively, the sealing member 46 may be non-resilient but hermetically conformable, and it could be fashioned as a replaceable gasket. The seal extends annularly about the cylindrical opening or passage between the clean air source or filter cartridge 14 and helps define the interior gas space located between the mask body 12 and the wearer's face. To prevent further rotation during the engagement process, the end 65 (FIG. 5) of thread 60 (FIG. 5) strikes the stop. The stop is disposed in an associated location with the threads such that it prevents further rotation of threaded portion 58 relative to threaded portion 34. The term "associated" locations means that the stop is positioned to such that it can prevent further rotational motion when the threads are in a mating, engaged, or semi-engaged relationship. The rigid structural member 18 is located on the exterior of compliant face-contacting member 16, and the lower portion of member defines a valve cover 27 for the exhalation valve. The filter cartridge also may be constructed without a rigid housing using, for example, spaced front and rear walls that have a filter media disposed therebetween—see U.S. Patent RE 35,062 to Brostrom et al.

Figure 7:
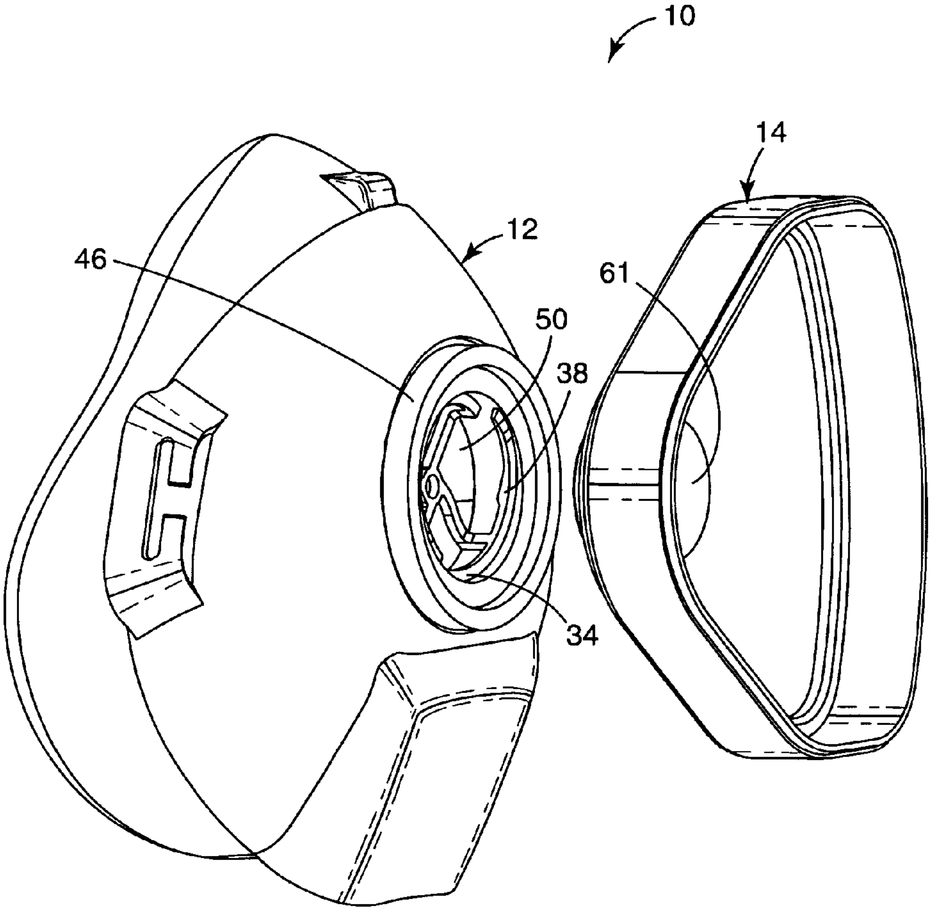
FIG. 7 is a perspective view of a personal respiratory protection device 10 in accordance with the present invention, showing the mask body 12 and filter cartridge 14 in position ready for engagement.

FIG. 7 shows mask body 12 and filter cartridge 14 just before engagement. To cause the two parts to be joined together in a mating relationship, the respective openings 50 and 61 are axially aligned and the two parts are rotated with respect to one another upon initial contact. In this embodiment, the filter cartridge 14 would be rotated clockwise while the mask body 12 remains stationary, or vice versa, or a combination thereof. Because a high-pitch thread is used on the respective mating parts, the filter cartridge may be joined to the mask body in about one turn or less, preferably less than about one half turn, and more preferably less than about one-quarter turn, from the point where the threads begin to mate. The threaded portions are designed such that the filter cartridge, while having the freedom to turn anywhere along the respirator thread, preferably only engages the opposing part within the last quarter-turn of rotation. The amount of rotation may be modified for the particular device. As the two parts are turned relative to one another, the axially movement towards each other causes the sealing component to compress in the area immediately surrounding the coupled parts. As indicated, this can provide a continuous seal along the entire perimeter of the juxtaposed parts. At the completion of the rotation, the male portion 38 of the détente on the first threaded portion 34 reaches a female portion 64 (FIG. 6) of the détente, causing a snap action as the male portion 38 of the détente falls into the female portion 64 (FIG. 6) of the détente on the filter cartridge thread 60 (FIG. 6). The détente is fashioned to preclude the filter cartridge from loosening during normal use. The détente and threads are also designed to enable the filter cartridge to be removed for replacement purposes. The sealing component can be resiliently fashioned to create a load that keeps the détente engaged while the two parts are joined. That is, the resilient sealing member 46 pushes the filter cartridge and mask body 12 away from each other in the axial direction to create a force that assists in maintaining a mating between the male and female portions of the détente. The first and second threaded portions can be fashioned such that the tension (between them) increases as the parts are rotated into engagement, but that tension is reduced when the male and female portions of the détente come into engagement. The sealing member 46 may further provide some tension between the two threads to keep the parts mutually engaged while the male and female portions of the détente are in alignment. The stop may be provided at the end of the threads or at any other appropriate location that prevents further rotation when the parts are in proper alignment and the détente is engaged. The stop may be positioned just after the point where the male détente falls into the female détente. The stop feature also may be combined with a détente to assist in keeping the filter cartridge and mask body securely joined together. When using a détente and stop that are integral to the thread, the overall system may be more compact and easier to implement than if the détente and/or stop were on other surfaces or portions of the mask body and filter cartridge.

The inventive system can be fashioned to have multiple threads, with the engagement points and stop point(s) located to allow only one possible orientation of the clean air source component when secured to the mask body. The design of the threaded attachment may provide a fixed orientation that allows off-center mounting of a filter cartridge—see, for example U.S. Pat. No. 5,062,421 to Burns et al. In contrast, conventional threaded systems typically have the filter cartridge centered around the port through which air is delivered to the interior gas space. An off-center inlet port may have the advantage of allowing a multitude of shapes and placements of the filtering component. This in turn may allow optimization of the respiratory system to improve the wearer's field of vision and the fitting of the filtering component on the mask body. Keeping the clean air source component close to the face may also improve balance and comfort considerations. Although the system has been shown with the male détente associated with the mask body, the integral détente portions may be switched. Similarly, the male threaded portion of the filter cartridge could be provided on the mask body instead. As indicated above, the invention also may be used with positive pressure systems and with full-face masks that cover the eyes as well as the nose and mouth. And the threaded system could be configured to be non-removable to, for example, prevent users in the workplace from selecting the wrong filter cartridge. This invention thus may take on various modifications and alterations without departing from the spirit and scope thereof. Accordingly, it is to be understood that this invention is not to be limited to the above-described, but it is to be controlled by the limitations set forth in the following claims and any equivalents thereof.

It is also to be understood that this invention may be suitably practiced in the absence of any element not specifically disclosed herein.

All patents and patent applications cited above, including those in the Background section, are incorporated by reference into this document in total.

What is claimed is:

1. A personal respiratory protection device that comprises:

(a) a mask body that has a first threaded portion;

(b) a clean air supply source that has a second threaded portion, the second threaded portion being adapted to mate with the first threaded portion on the mask body, wherein (i) the first and second threaded portions engage each other at a high thread pitch;

(ii) the first and second threaded portions comprise an integral détente; and (iii) the first and second threaded portions have a stop associated therewith, which stop prevents over-rotation of the clean air supply source relative to the mask body during securement of the clean air supply source to the mask body.

2. The personal respiratory protection device of claim 1, further comprising a resilient sealing component that is disposed between engaging portions of the clean air supply source and the mask body.

3. The personal respiratory protection device of claim 2, wherein the clean air supply source is a filter cartridge.

4. The personal respiratory protection device of claim 1, wherein the clean air supply source is a filter cartridge.

5. The personal respiratory protection device of claim 4, wherein the filter cartridge includes a housing and a cover into which a filter element is contained.

6. The personal respiratory protection device of claim 1, wherein the stop is integral to the first threaded portion, the second threaded portion, or a combination thereof.

7. The personal respiratory protection device of claim 1, wherein the détente provides an easing of tensions between the first and second threaded portions when the détente is engaged.

8. The personal respiratory protection device of claim 1, wherein the détente also acts to prevent inadvertent reverse rotation when engaged.

9. The personal respiratory protection device of claim 1, wherein the mask body includes a compliant face contacting member, and wherein the resilient sealing member is integral to the compliant face contacting member.

10. The personal respiratory protection device of claim 1, wherein the mask body includes a rigid structural member that defines exhalation and inhalation valves and provides support for a harness.

11. The personal respiratory protection device of claim 1, wherein the high pitch thread advances axially about 5 to 15 mm per revolution.

12. The personal respiratory device of claim 1, wherein the high pitch thread advances axially about 6 to 8 mm per revolution.

13. The personal respiratory protection device of claim 1, wherein the first and second threaded portions each have two threads.

14. The personal respiratory protection devise of claim 13, wherein the high pitch thread advances axially about 6 to 8 mm per revolution.

15. The personal respiratory protection device of claim 13, wherein each thread includes a portion of an integral détente.

16. A personal respiratory protection device that comprises:

(a) a mask body that has a first threaded portion;

(b) a clean air supply source that has a second threaded portion, the second threaded portion being adapted to mate with the first threaded portion on the mask body;

(c) a means for allowing the first and second threaded portions to engage each other at a high thread pitch;

(d) a means disposed on and integral to the first and/or second threaded portions for providing an indication of engagement between the clean air supply source and the mask body; and (e) a means for preventing over-rotation of the clean air supply source relative to the mask body during securement of the clean air supply source to the mask body.

* * * * *

UNITED STATES PATENT AND TRADEMARK OFFICE

CERTIFICATE OF CORRECTION

PATENT NO. : 7,320,722 B2
APPLICATION NO. : 10/977076
DATED : January 22, 2008
INVENTOR(S) : William A. Mittelstadt It is certified that error appears in the above-identified patent and that said Letters Patent is hereby corrected as shown below:

Column 10
Line 1, in claim 12, before “device” insert --protection--.

Line 7, in claim 14, delete “devise” and insert --device--.

Signed and Sealed this

Twenty-seventh Day of May, 2008

JON W. DUDAS
*Director of the United States Patent and Trademark Office*